(12) United States Patent
Castellano

(10) Patent No.: US 7,438,422 B1
(45) Date of Patent: Oct. 21, 2008

(54) SIMPLIFIED NIGHT SKY DISPLAY SYSTEM

(75) Inventor: Timothy P. Castellano, San Juan Bautista, CA (US)

(73) Assignee: United States of America as represented by the Administrator of the National Aeronautics & Space Administration, Washington, DC (US)

( * ) Notice: Subject to any disclaimer, the term of this patent is extended or adjusted under 35 U.S.C. 154(b) by 481 days.

(21) Appl. No.: 11/340,816

(22) Filed: Jan. 18, 2006

(51) Int. Cl.
*G03B 21/14* (2006.01)
*G03B 21/30* (2006.01)
*G09B 27/00* (2006.01)
*G09B 27/04* (2006.01)

(52) U.S. Cl. .................. 353/79; 353/122; 434/284; 434/287

(58) Field of Classification Search .................. 353/21, 353/22, 10, 28, 29, 79, 122; 349/6; 434/111, 434/131, 137, 138, 284–290
See application file for complete search history.

(56) References Cited

U.S. PATENT DOCUMENTS

| | | | | |
|---|---|---|---|---|
| 3,250,024 A | * | 5/1966 | Douthitt et al. | 434/286 |
| 6,644,816 B1 | * | 11/2003 | Perra et al. | 353/119 |
| 6,739,725 B2 | * | 5/2004 | Ben-Ari | 353/28 |
| 7,004,588 B2 | * | 2/2006 | Sadler | 353/28 |
| 7,229,176 B2 | * | 6/2007 | Onaga | 353/10 |

\* cited by examiner

*Primary Examiner*—Andrew T Sever
(74) *Attorney, Agent, or Firm*—John F. Schipper; Robert M. Padilla

(57) ABSTRACT

A portable structure, simply constructed with inexpensive and generally lightweight materials, for displaying a selected portion of the night sky and selected planets, satellites, comets and other astronomically observable objects that are visually perceptible within that portion of the night sky. The structure includes a computer having stored signals representing the observable objects, an image projector that converts and projects the stored signals as visually perceptible images, a first curvilinear light-reflecting surface to receive and reflect the visually perceptible images, and a second curvilinear surface to receive and display the visually perceptible images reflected from the first surface. The images may be motionless or may move with passage of time. In one embodiment, the structure includes an inflatable screen surface that receives gas in an enclosed volume, supports itself without further mechanical support, and optionally self-regulates pressure of the received gas within the enclosed volume.

13 Claims, 4 Drawing Sheets

SIMPLIFIED NIGHT SKY DISPLAY SYSTEM

ORIGIN OF THE INVENTION

This invention was made, in part, by an employee of the U.S. government. The U.S. government has the right to make, use and/or sell the invention described herein without payment of compensation therefor, including but not limited to payment of royalties.

FIELD OF THE INVENTION

This invention relates to a planetarium for simulation of the appearance of portions of the night sky.

BACKGROUND OF THE INVENTION

Planetaria, for display of observable objects in the night sky, have become increasingly complex to assemble and to operate as the planetaria designers have sought to capture more and more of the astronomically observable features. On the positive side, this development has led to night sky displays of unparalleled detail, incorporating features that were not available to professional astronomy educators fifty years ago. On the negative side, these display systems often require special training to operate, require permanent set-ups that cannot be moved or are moved only with difficulty, and are expensive to purchase and to maintain.

What is needed is a simpler night sky display system that has only a few portable and simple components that can be assembled and/or disassembled easily and quickly, that do not require expensive or extensive maintenance procedures, and that are easily modified to different night sky scenes.

SUMMARY OF THE INVENTION

These needs are met by the invention, which provides a simple night sky display system that is portable (total volume no more than about $10^6$ cm$^3$ in a disassembled state), that is lightweight (total mass no more than about 20 kilograms), and includes at most four components in its simplest configuration: (i) a computer, having a temporary or permanent memory that contains at least one signal representing one or more images of a portion of the sky when viewed from an arbitrarily selectable position at a selected time (past, present, future); (ii) a projector that receives the at least one image signal from the computer and forms and projects a visually perceptible image; (iii) a substantially spherical light-reflecting first surface and mount, having a first surface geometric center at a selected location, for receiving and reflecting at least a portion of the visually perceptible image from the projector; and (iv) a substantially spherical second surface, having a shape of a steradial sector of a hemisphere and having a second surface geometric center located at substantially the same location as the first surface geometric center, for receiving and displaying the visually perceptible image reflected from the first surface.

The first surface may be wood, plastic, fiberglass, glass and/or a similar material, to which a light-reflecting coating is conformally applied. The second surface may be cloth, paper, cardboard, wood, fabric and/or a similar foldable material. The projector optionally includes a position adjustment mechanism for adjusting height and/or angular orientation of the first surface.

The system may be used to simulate selected portions of the night sky, preserving the appearance and kinesthetic sense of the celestial sphere surrounding the Earth or any other selected position in space. This includes locations, at a particular time selected by the operator, and motions of planets, stars, galaxies, nebulae and comets that are visible from the selected position. The first surface, second surface, projector and computer components can be disassembled and packed into a volume no larger than about 27,000 cm$^3$, with a associated mass no greater than about 20 kgm, or larger if desired The array of images that can be presented is limited only by the computer software that is available or can be developed.

DESCRIPTION OF BEST MODES OF THE INVENTION

Figure 1:
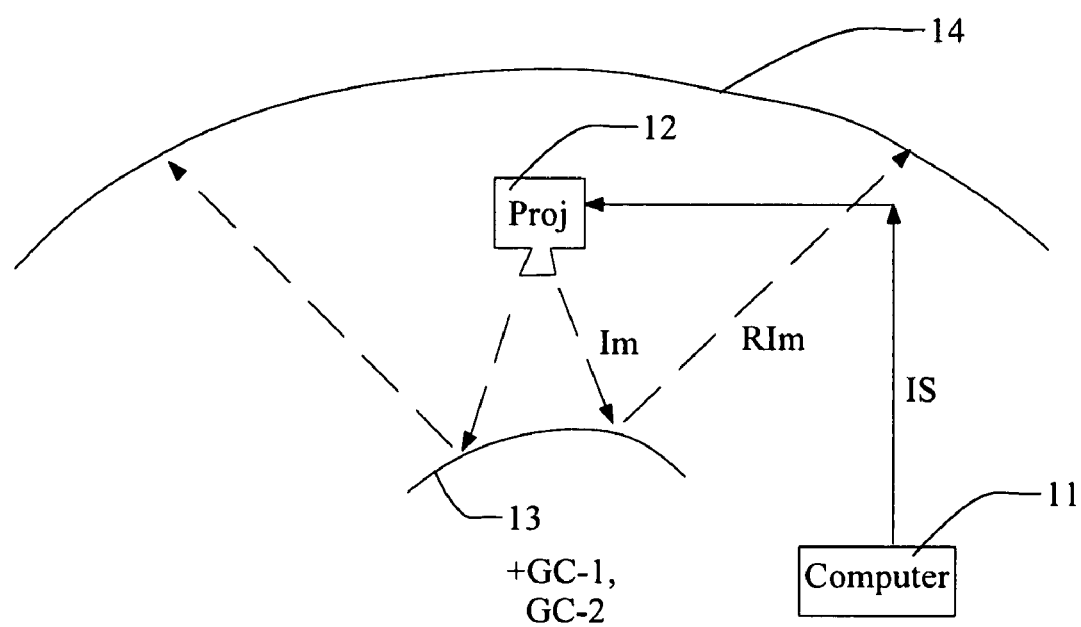
FIG. 1 schematically illustrates an embodiment of the invention.

FIG. 1 schematically illustrates an embodiment of the inventive display structure 10, which includes: (i) a computer II having a permanent or temporary memory containing at least one image signal IS representing one or more images of a portion of a "night sky" (defined to be a contiguous portion of a celestial sphere that is viewable from a selected position in space, including but not limited to a position on the Earth, at a selected time that may but need not correspond to "nighttime" at that selected position); (ii) a projector 12 that receives the at least one signal IS from the computer 11 and forms and projects a visually perceptible image Im of the portion of the night sky; (iii) a substantially spherical light reflecting first surface 13, having a first surface geometric center GC-1 at a selected location, for receiving and reflecting at least a portion of the visually perceptible image Im from the projector 12 as a reflected image RIm; (iv) a substantially spherical light reflecting second surface 14, optionally having a shape of a steradial sector of a hemisphere (a fraction of the 2π steradians defined by a hemisphere) and having a second surface geometric center GC-2 that is substantially the same as the first surface geometric center, for receiving and displaying the reflected visually perceptible image RIm of a portion of the night sky reflected from the first surface; and (v) an interior region 15 between the first and second surfaces.

The projector 12 optionally includes a position adjustment mechanism 12PAM that is controllably movable in at least two directions, from among three substantially orthogonal directions, such as up/down, right/left and forward/rearward, to allow adjustment of the position (location and/or angular orientation) of the visually perceptible image received by the first surface 13.

Figure 2:
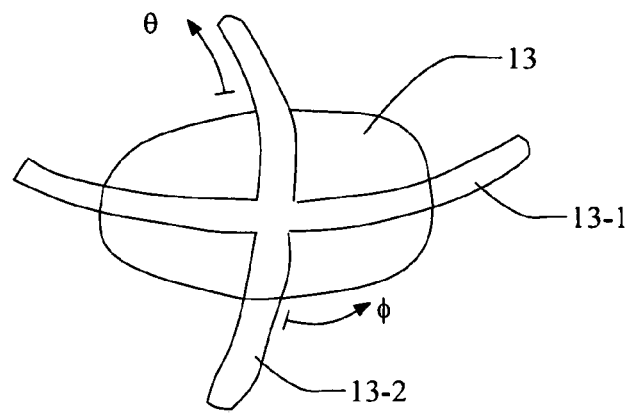
FIG. 2, schematically illustrates use of a first surface position adjustment that is optionally part of the invention.

Optionally, the first surface 13 is moved along a first curvilinear (horizontal) track 13-1, corresponding to an azimuthal angle $\phi$, and independently along a second (vertical) track 13-2, corresponding to a polar angle $\theta$, as illustrated in FIG. 2. Movement of the first surface 13 along one or both of the tracks, 13-1 and 13-2, will change the position of the image that appears on the second surface 14.

Figure 3A:
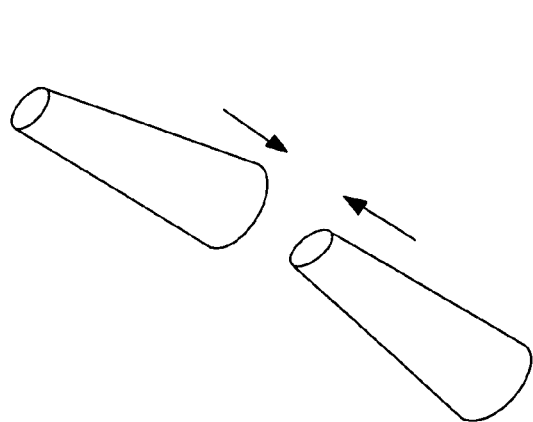
FIGS. 3A, 3B and 4 illustrate how tube sections in the invention fit together to support a light reflecting second surface, such as a screen.
Figure 3B:
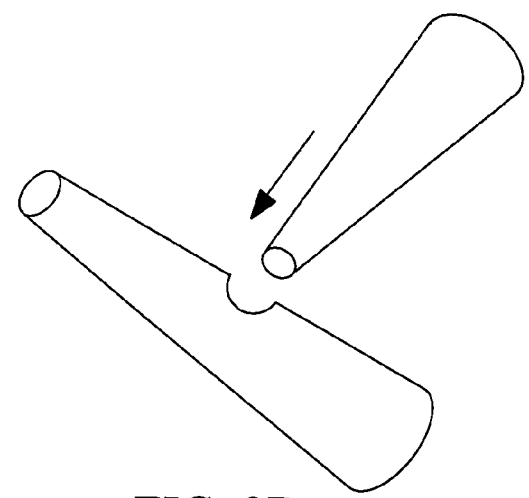
Figure 4:
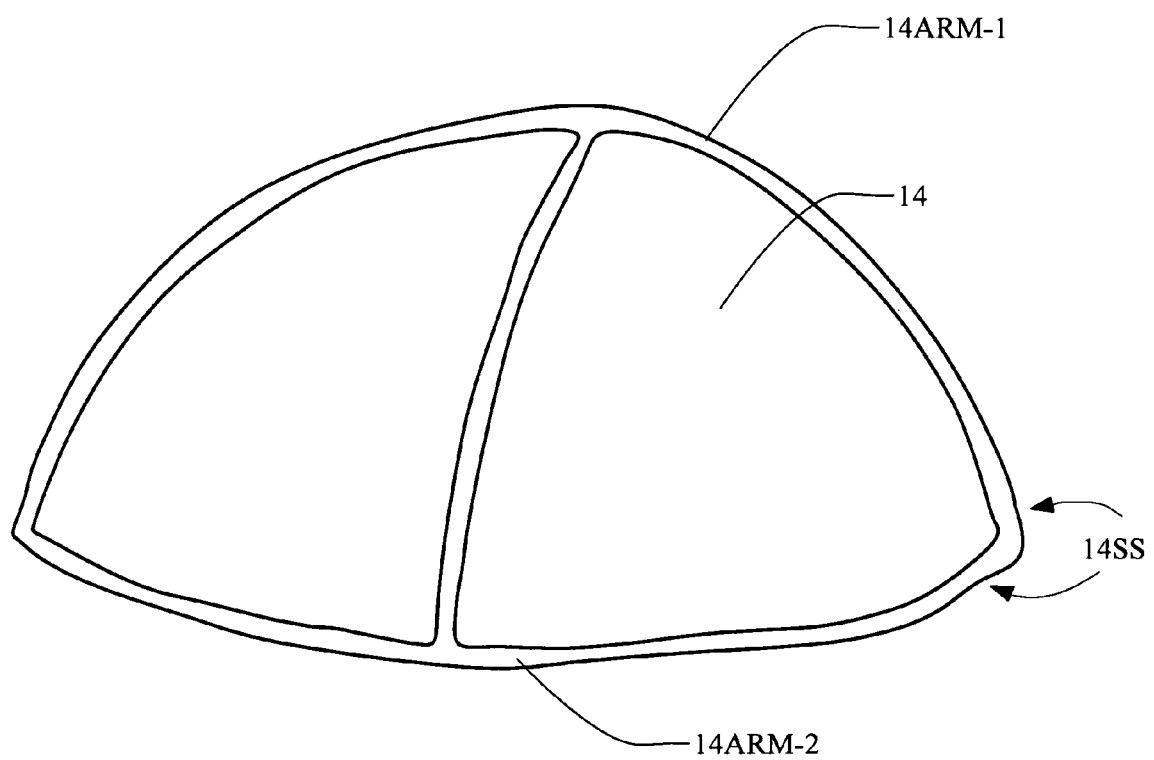

The second surface 14 shown in FIG. 1 is optionally a selected portion of a hemisphere, such as a quarter-sphere that subtends π steradians, having a radius R(14) preferably in a range $1.5\,M \leq R(14) \leq 20\,M$, this surface (apart from a second surface support structure 14SS, shown in FIG. 4) can be folded. If the second surface 14 is made of fabric or another foldable surface, this component, other than the support structure 14SS, can be folded into a compact volume estimated to be 30×30×30 cm$^3$, or larger or smaller if desired. The support structure 14SS for the second surface is decomposable into a collection of N tube sections (N≧2), each preferably conical rather than cylindrical in cross section, that fit together end to end and/or intersect and mate with each other, as illustrated in FIGS. 3A and 3B. In one embodiment of the support structure 14SS in FIG. 4, a first portion of the support structure extends along a perimeter of the second surface, and a second portion of the support structure extends from a first arm 14ARM-1 of the perimeter to a second arm 14ARM-2, as illustrated in FIG. 4. Two advantages of use of a collection of tube sections, as part of the second surface support structure 14SS, are that (1) the diameter or size of the support structure 14SS can be varied according to the size of the second surface that is needed and (2) the support structure 14SS can be disassembled into a collection of individual tube sections for portability.

Alternatively, the second surface support structure 14SS can be one or a few relatively large "rib" sections, also illustrated in FIG. 4, that serve as a single unit to support the second surface 14 and may be, but need not be, portable.

Figure 5:
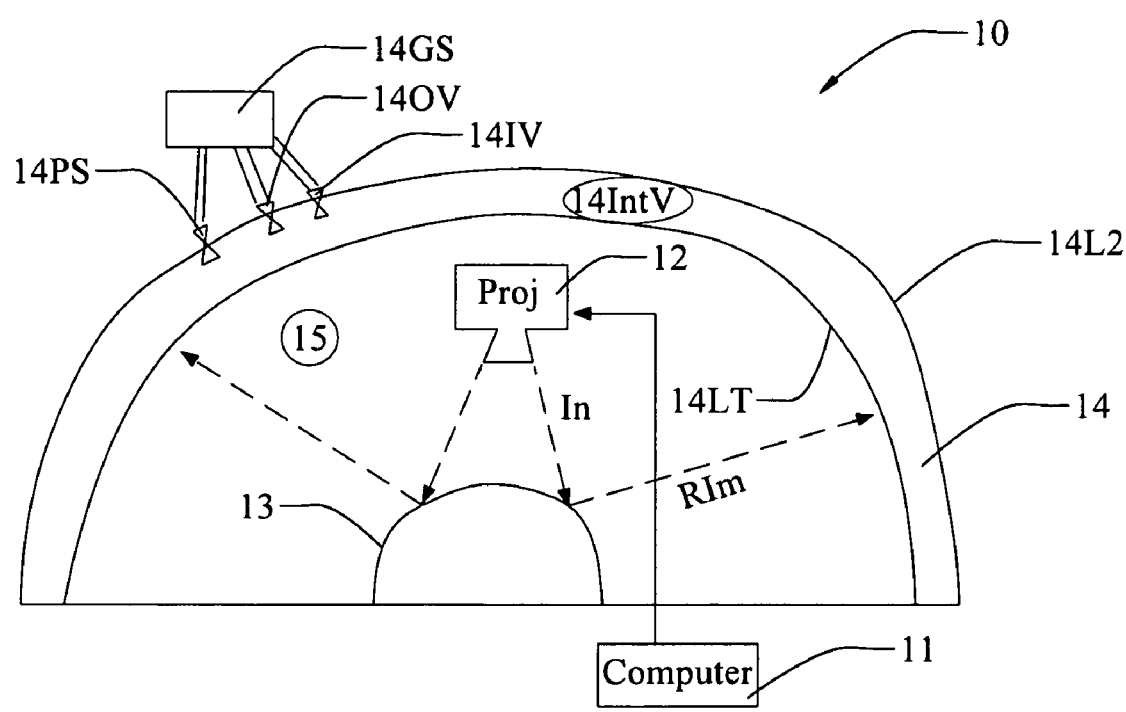
FIG. 5 illustrates use of an inflatable structure as part of the invention.

Alternatively, the second surface 14 and an associated support structure for the display structure 10' can be an inflatable structure, including a light-reflecting screen 14L1, as illustrated in FIG. 5. The display screen component includes first and second layers, 14L1 and 14L2, which are spaced apart by a varying separation distance d(sep) and which together preferably define a closed volume 14IntV that is connected to a pressurized gas source 14GS through an activatable inlet valve 14IV. The first layer 14L1 preferably conforms to a substantially spherical or spheroidal surface that receives and display an image of a portion of the simulated night sky. The second surface 14 defines and encloses the interior volume 14IntV.

In FIG. 5, the inlet valve 14IV admits a controllable amount of the gas from the source 14GS (e.g., a fan or pressurized gas delivery system) into the volume 14IntV, thereby increasing (by inflation) the enclosed volume within 14IntV that is enclosed by the first and second layers, 14L1 and 14L2, and "stiffening" and supporting the light-reflecting first layer 14L1 and second layer 14L2, for improved image presentation on the first layer 14L1. The pressure differential Δp (relative to ambient air pressure of about 14.7 psi or another pressure value) required to support the first and second layers, 14L1 and 14L2, is very small, (e.g., 0.05-2 psi), because of the relatively large surface area and the relatively low mass of the first and second layers. In its inflated condition, the second surface 14 is preferably sufficiently "stiffened" to support itself so that a supplemental support structure is not needed: the second surface 14 becomes self-supporting or self-standing. The gas introduced into the volume 14V may be one or more of air, $N_2$, CO, $CO_2$, He, Ne, Ar, Kr, Xe, air or any other suitable gas, preferably relatively inert.

Optionally, the valve 141V in FIG. 5, or another associated valve 140V, may also function as an outlet valve to allow bleed-off of the positive pressure differential (inside versus ambient) in the interior volume 14IntV, for example, to disassemble and/or transport the structure 10'. Alternatively, the volume 14IntV or the inlet valve 141V may be provided with a pressure sensing mechanism 14PS, associated with the gas source 14GS, that determines and responds to the present pressure differential Δp. When this pressure differential decreases below a threshold value Δp(thr) (e.g., required to support the second surface 14), the inlet valve 14IV is (re)opened, and additional gas is admitted into the volume 14IntV until the present pressure differential is at least equal to (1+f)Δp(thr), where f is a selected non-negative value (e.g., f=0 or 0.5 or 1 or 2 or 5 or 10). The pressure sensing mechanism 14PS will cause the pressure differential mechanism to vary reasonably smoothly between Δp(thr) and (1+f)Δp(thr).

The embodiment of FIG. 5 does not require that the interior 15 (FIGS. 1, 5) of the structure between the first surface 13 and the second surface 14 be pressurized or temperature controlled. For this reason, the structure 10' for the embodiment in FIG. 5 can be easily scaled up or scaled down, according to the size of the viewing audience, without concern about environmental variables such as interior pressure or interior temperature.

What is claimed is:

1. A structure for displaying configuration of a portion of the night sky, the structure comprising:
    a computer, having a temporary or permanent memory that contains at least one image signal representing one or more images of a portion of the sky when viewed from an arbitrarily selectable position;
    a projector that receives the at least one image signal from the computer and forms and projects a visually perceptible image;
    a substantially spherical light-reflecting first surface and first surface positioning mechanism, having a first surface geometric center at a selected location, for receiving and reflecting at least a portion of the visually perceptible image from the projector; and
    a second surface, having a shape of substantially a steradial sector of a hemisphere and having a second surface geometric center located at substantially the same location as the first surface geometric center, for receiving and displaying the visually perceptible image reflected from the first surface,
    wherein the computer, the projector, the first surface and the second surface have a total mass not, exceeding about 20 Kgm.

2. The structure of claim 1, wherein said first surface and positioning mechanism comprises a position adjustment mechanism for: (i) adjusting a representative height of said first surface and (ii) adjusting an angular orientation of said first surface about independently oriented first and second axes of rotation of said first surface.

3. The structure of claim 1, wherein said first surface comprises:
    a first substantially spherical layer, drawn from the group of materials consisting of wood, plastic, fiberglass and glass; and
    a second layer that is a light reflecting coating conformally applied in association with the first layer.

4. The structure of claim 1, wherein said second surface comprises a second surface drawn from a group consisting of cloth, paper, cardboard, wood and fabric.

5. The structure of claim 1, wherein said computer, said projector, said first surface and said second surface can be disassembled and contained in a total volume not exceeding about 27000 cm$^3$.

6. The structure of claim 1, wherein said computer is programmed to display at least one of (i) said night sky at two or more spaced apart times and (ii) said night sky viewed from at least first and second selectable positions.

7. The structure of claim 1, wherein said second surface is foldable or flexible, further comprising a support structure to support said second surface, the support surface comprising (i) a first collection of tube sections that fit together end to end and are attached to a perimeter of said second surface and (ii) a second collection of tube sections, having at least first and second tube sections that intersect with and attach, at first and second spaced apart locations, to third and fourth tube sections, respectively, in the first collection, to hold the third and fourth tube sections apart from each other.

8. The structure of claim 7, wherein at least two tube sections in said first collection of tube sections have a conical cross section.

9. The structure of claim 7, wherein at least two tube sections in said second collection of tube sections have a conical cross section.

10. The structure of claim 1, wherein said second surface comprises:

at least first and second surface components, connected together to define an enclosed volume that can receive and hold a gas and that supports a self-standing second surface when gas having at least a selected threshold pressure difference relative to ambient air pressure outside the enclosed volume is contained in the enclosed volume, where at least one surface component of said second surface is substantially a portion of a spherical or spheroidal surface and reflects said visually perceptible image received at said second surface; and a gas inlet valve, associated with at least one of the first and second surface components, to permit the gas to be introduced into the enclosed volume.

11. The structure of claim 10, wherein said gas inlet valve also serves as a gas outlet valve to allow gas to be removed from said enclosed volume.

12. The structure of claim 10, further comprising a gas control mechanism, associated with said gas inlet valve, that: (1) senses a pressure difference between said gas within said enclosed volume and said ambient gas; and (2) when the sensed pressure difference is less than a selected threshold pressure difference, the gas control mechanism causes said gas inlet valve to introduce additional gas into said enclosed volume.

13. The structure of claim 10, wherein said gas is a combination of one or more selected gases drawn from the group consisting of air, $N_2$, CO, $CO_2$.He, Ne, Ar, Kr, Xe and air.

* * * * *